United States Patent
Fauchery et al.

(10) Patent No.: US 10,641,303 B2
(45) Date of Patent: May 5, 2020

(54) CONNECTOR ASSEMBLY FITTING WITH CO-MOLDED WASHERS

(71) Applicants: SKF Aerospace France S.A.S, Saint-Vallier (FR); Aktiebolaget SKF, Göteborg (SE)

(72) Inventors: Florent Fauchery, Montmeyran (FR); Anthony Jerome, Lons-le-Saunier (FR); Richard Schaake, Utrecht (NL); Yves Maheo, Anneyron (FR)

(73) Assignees: AKTIEBOLAGET SKF, Gothenburg (SE); SKF AEROSPACE FRANCE S.A.S., Saint-Vallier (FR)

( * ) Notice: Subject to any disclaimer, the term of this patent is extended or adjusted under 35 U.S.C. 154(b) by 475 days.

(21) Appl. No.: 15/377,223

(22) Filed: Dec. 13, 2016

(65) Prior Publication Data

US 2018/0163758 A1    Jun. 14, 2018

(51) Int. Cl.
*F16B 5/00*    (2006.01)
*F16B 43/00*    (2006.01)
(Continued)

(52) U.S. Cl.
CPC ............ *F16B 5/0088* (2013.01); *F16B 43/00* (2013.01); *B64C 1/069* (2013.01); *E04B 2002/725* (2013.01); *Y10T 403/42* (2015.01)

(58) Field of Classification Search
CPC ... B64C 1/069; B64C 1/12; E04B 2001/3282; E04B 2002/725; F16B 5/0056;
(Continued)

(56) References Cited

U.S. PATENT DOCUMENTS

| 471,610 | A | * | 3/1892 | Hart | ................... F16B 12/46 |
| | | | | | 403/403 |
| 4,067,168 | A | * | 1/1978 | Thurner | ............... E04B 5/29 |
| | | | | | 52/854 |

(Continued)

OTHER PUBLICATIONS

"Dowel Bushings for Bolt Alignment." EFC International. Aug. 14, 2014, [online], [retrieved on Jan. 7, 2019]. Retrieved from the Internet. <URL: https://web.archive.org/web/20140814004215/http://www.efc-intl.com:80/products/dowel-bushings-for-bolt-alignment.htm>. (Year: 2014).*

*Primary Examiner* — Josh Skroupa
(74) *Attorney, Agent, or Firm* — J-Tek Law PLLC; Scott T. Wakeman; Mark A. Ussai (57) ABSTRACT

The connector assembly includes a fitting with a first mounting portion having two opposing surfaces and mounting hole(s) extending between the two surfaces for connecting with a first member. A second mounting portion extends angled with respect to the first mounting portion and has two opposing surfaces and mounting hole(s) extending between the two for connecting with a second member. A joint portion integrally connects the first and second mounting portions. One or more washers each have opposing upper and lower surfaces and at least one hole extending between the two surfaces, each receiving a fastener for attaching the second mounting portion to the second member. The washer lower surface is disposed on the second mounting portion inner surface such that the washer opening is centered about the at least one mounting hole axis. Each washer is joined to the second mounting portion to form an integral assembly.

15 Claims, 9 Drawing Sheets

(51) Int. Cl.
*B64C 1/06* (2006.01)
*E04B 2/72* (2006.01)

(58) Field of Classification Search
CPC ........ F16B 5/0084; F16B 5/0088; F16B 5/02;
F16B 5/0614; F16B 43/00; F16B 43/02;
F16B 43/025
USPC .................................................. 403/205, 403
See application file for complete search history.

(56) References Cited

U.S. PATENT DOCUMENTS

| | | | | |
|---|---|---|---|---|
| 6,250,041 | B1 * | 6/2001 | Seccombe | E04B 1/2604 403/190 |
| 6,474,902 | B1 * | 11/2002 | Beauvoir | E04B 1/2403 403/403 |
| 7,104,024 | B1 * | 9/2006 | diGirolamo | E04B 2/767 403/231 |
| 7,299,593 | B1 * | 11/2007 | diGirolamo | E04B 2/58 52/241 |
| 8,397,454 | B2 * | 3/2013 | Commins | E04B 1/26 52/293.3 |
| 8,925,880 | B2 * | 1/2015 | Valembois | B29C 33/485 248/200 |
| 10,253,801 | B2 * | 4/2019 | Leichti | F16B 35/00 |
| 2006/0260259 | A1 * | 11/2006 | Morse | E04B 1/2608 52/698 |
| 2015/0284948 | A1 * | 10/2015 | Pozza | E02D 27/00 52/126.3 |

* cited by examiner

CONNECTOR ASSEMBLY FITTING WITH CO-MOLDED WASHERS

BACKGROUND OF THE INVENTION

The present invention relates to The present invention relates to connector assemblies, particularly connectors including fittings used to connect angled arranged members.

Fittings or brackets for connecting two or more members are generally known. When intended to connect to surfaces that are generally orthogonal to each other, such fittings/brackets are often generally L-shaped, generally T-shaped or "corner" shaped. In certain applications in which weight is an important consideration, such as the aircraft industry, the fittings may be made of a composite material of fibers embedded within resin. Often, special washers or other hardware are required to fasten such composite fittings into a final assembly.

SUMMARY OF THE INVENTION

In one aspect, the present invention is a connector assembly for connecting at least first and second members. The connector assembly comprises a fitting formed of a composite material including generally long strand fibers and resin. The fitting includes a first mounting portion having opposing first and second surfaces and at least one mounting hole extending between the first and second surfaces for connecting with the first member. A second mounting portion extends generally angled with respect to the first mounting portion and has opposing first and second surfaces and at least one mounting hole extending between the inner and outer surfaces for connecting with the second member, the at least one second portion mounting hole having a central axis. A joint portion integrally connects the first and second mounting portions. At least one washer has opposing upper and lower surfaces and at least one hole extending between the upper and lower surfaces. The washer hole is configured to receive a fastener for attaching the second mounting portion to the second member. Further, the washer lower surface is disposed on the second mounting portion inner surface such that the washer opening is generally centered about the at least one mounting hole axis. Furthermore, the washer is joined to the second mounting portion to form an integral assembly.

In another aspect, the present invention is again connector assembly for connecting at least first and second members. The connector assembly comprises a fitting formed of a composite material including generally long strand fibers and resin. The fitting includes a first mounting portion connectable with the first member and having opposing first and second surfaces and at least one mounting hole extending between the inner and outer surfaces for connecting with the first member. A second mounting portion extends generally angled with respect to the first mounting portion and is connectable with the second member. The second mounting portion has opposing first and second surfaces and at least one mounting hole extending between the first and second surfaces for connecting with the second member, the second portion mounting hole having a central axis. A joint portion integrally connects the first and second mounting portions. The connector assembly further comprises at least one washer and/or at least one insert, as follows. The at least one washer has opposing upper and lower surfaces and at least one hole extending between the upper and lower surfaces. The washer hole is configured to receive a fastener for attaching the second mounting portion to the second member. The washer lower surface is disposed on the second mounting portion inner surface such that the washer opening is generally centered about the at least one mounting hole axis. The washer is joined to the second mounting portion to form an integral assembly. The at least one insert is generally tubular and disposed within one of the mounting holes of one of the first and second mounting portions. The insert is also joined with the one mounting portion to form an integral assembly. Further, a sole is formed of generally short strand fibers and has an upper surface disposed against the second, lower surface of the second mounting portion and an opposing, generally flat lower surface. The sole is also joined to the fitting second mounting portion to form an integral assembly.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "upper" and "lower" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description.

Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
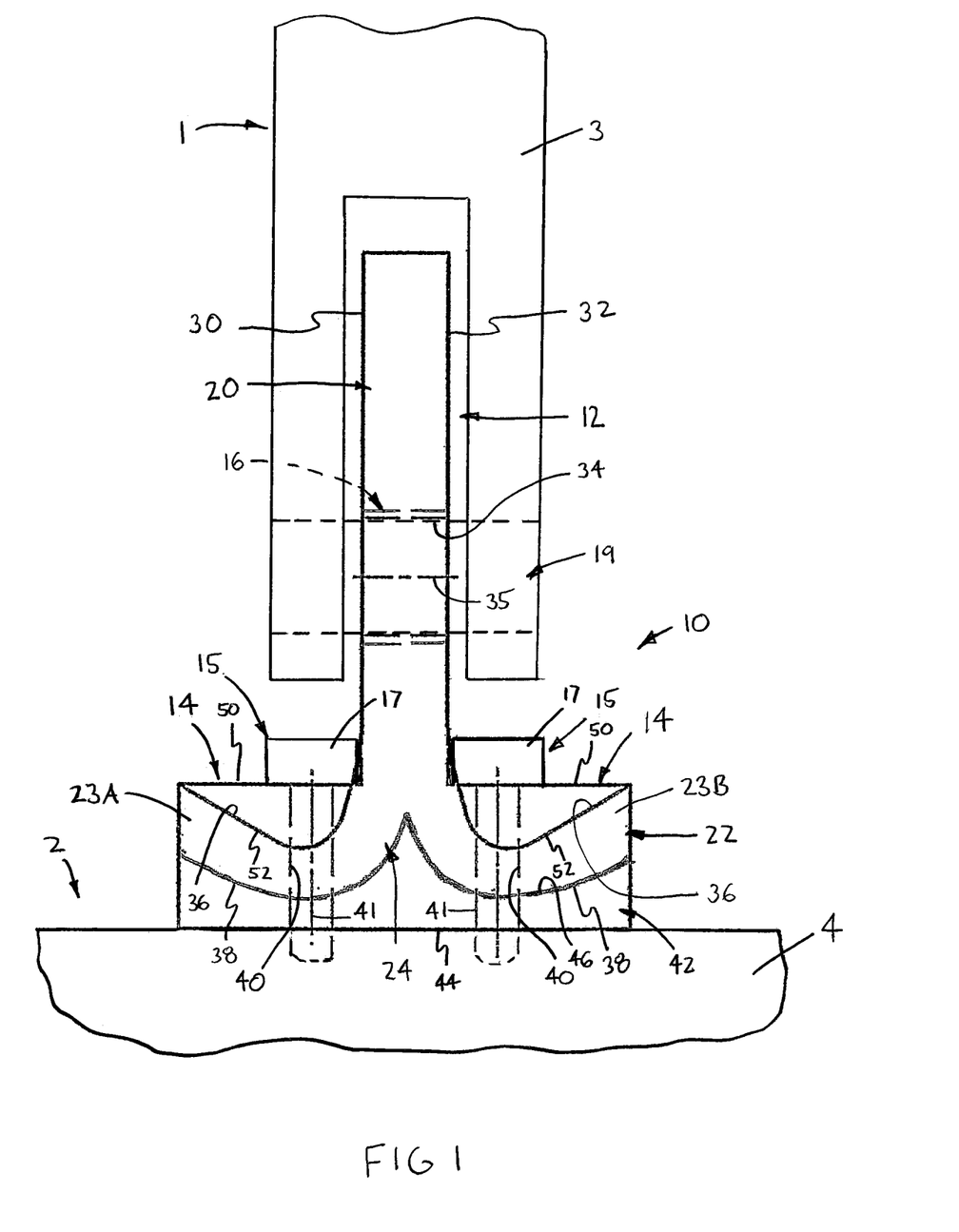
FIG. 1 is a side plan view of a connector assembly in accordance with the present invention and having a T-shaped fitting and a plurality of washers, shown connected with first and second members.
Figure 2:
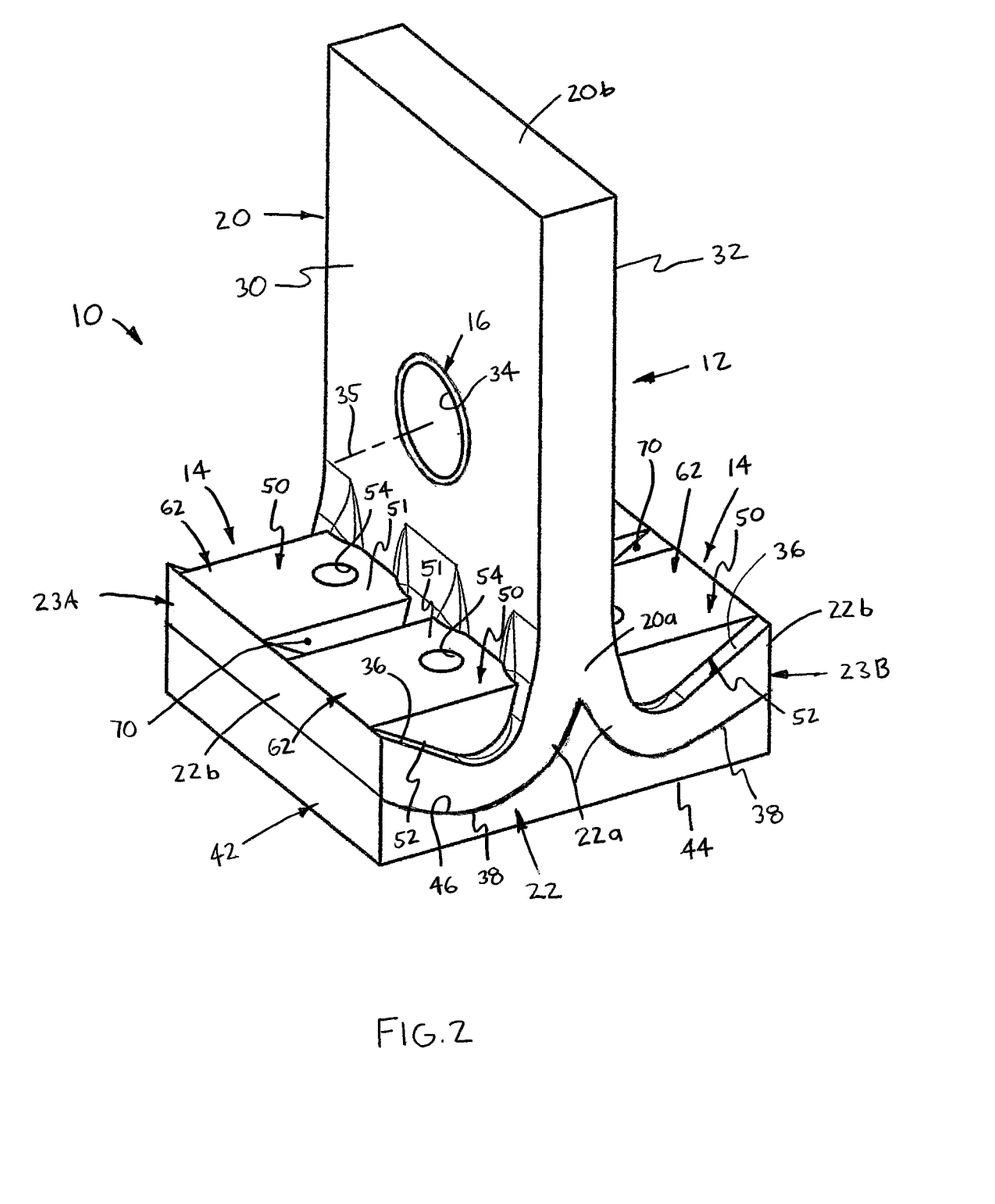
FIG. 2 is a perspective view of the connector assembly of FIG. 1.

Referring now to the drawings in detail, wherein like numbers are used to indicate like elements throughout, there is shown in FIGS. 1-14 a connector assembly 10 for connecting at least first and second members 1, 2, for example, a strut 3 and an airframe 4, and may be used to connect three or four members (only two shown). The connector assembly 10 basically comprises a fitting 12 and one or more washers 14 or/and one or more inserts 16, the washer(s) 14 and/or inserts 16 being joined to the fitting 12 to form an integral assembly 10. As such, the connector assembly 10 may be supplied "ready to install" in a structure, for example an airframe assembly (not shown), so that only fasteners 15 and/or pins 19 (FIG. 1) are required to couple the first and second members 1, 2, and possibly third or fourth members (no others shown).

Figure 12:
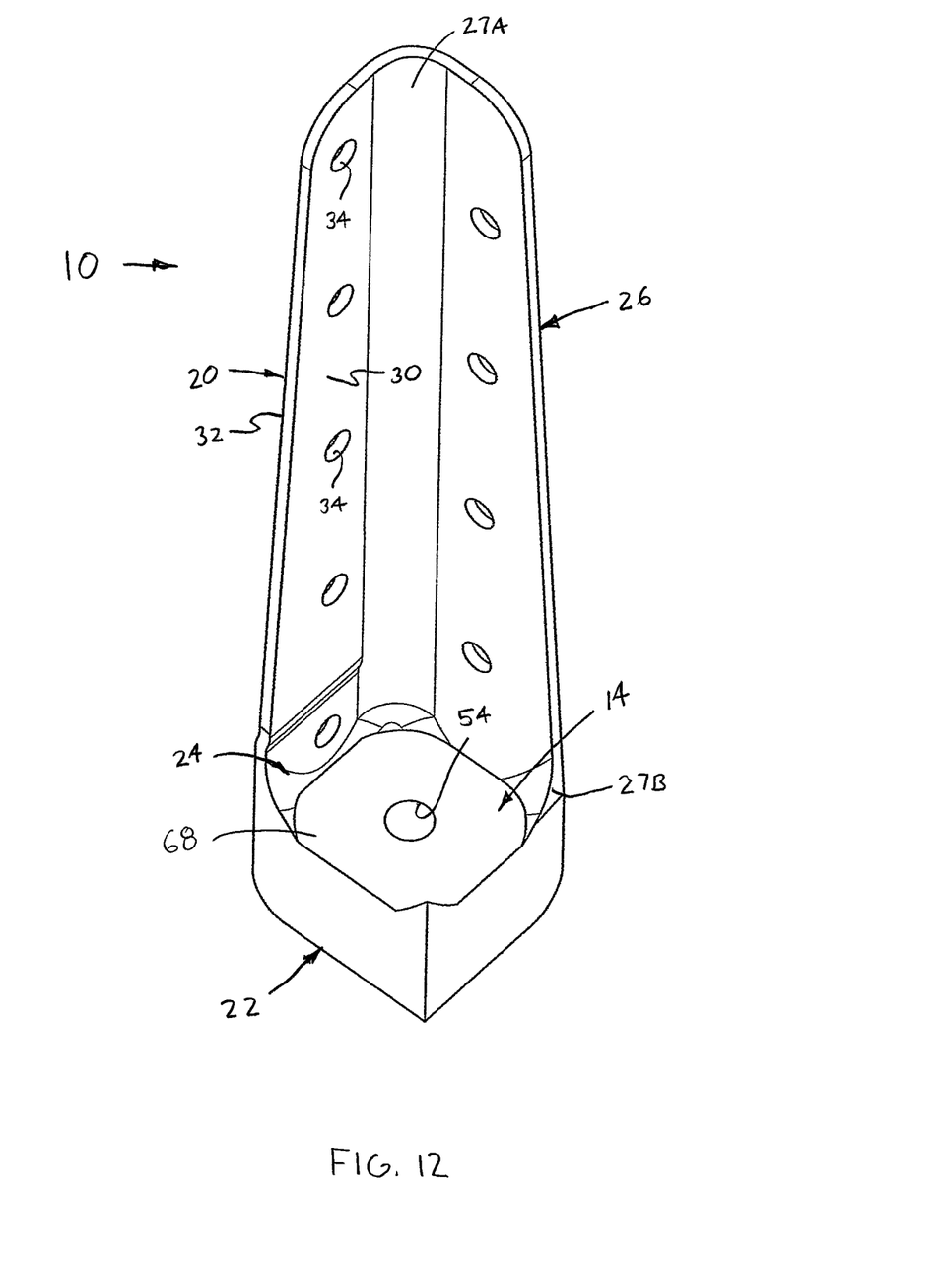
FIG. 12 is perspective view of a fourth construction of the connector assembly, shown with a "corner" shaped fitting having a third mounting portion and a single, partially spherical washer.
Figure 13:
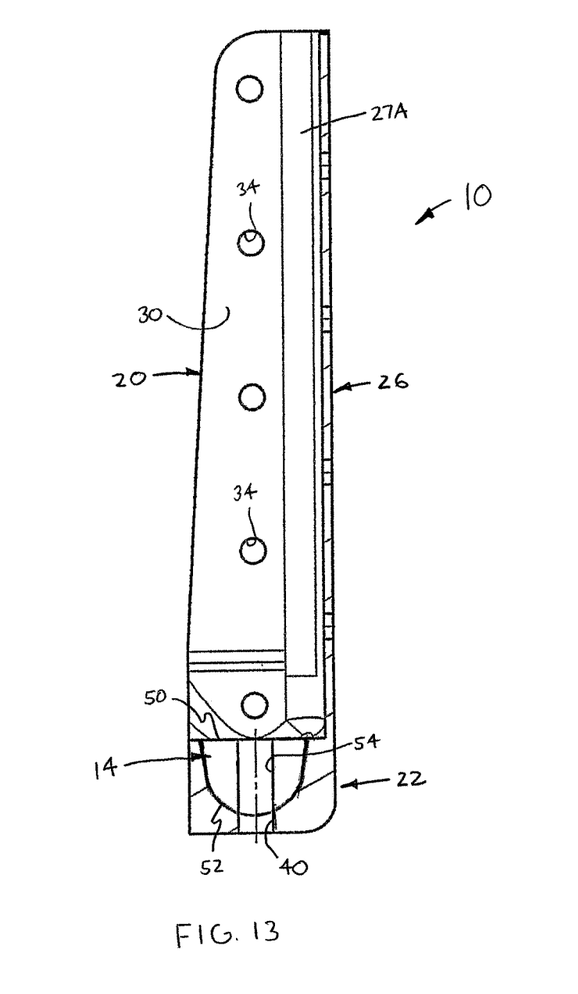
FIG. 13 is a cross-sectional view of the connector assembly of FIG. 12.
Figure 14:
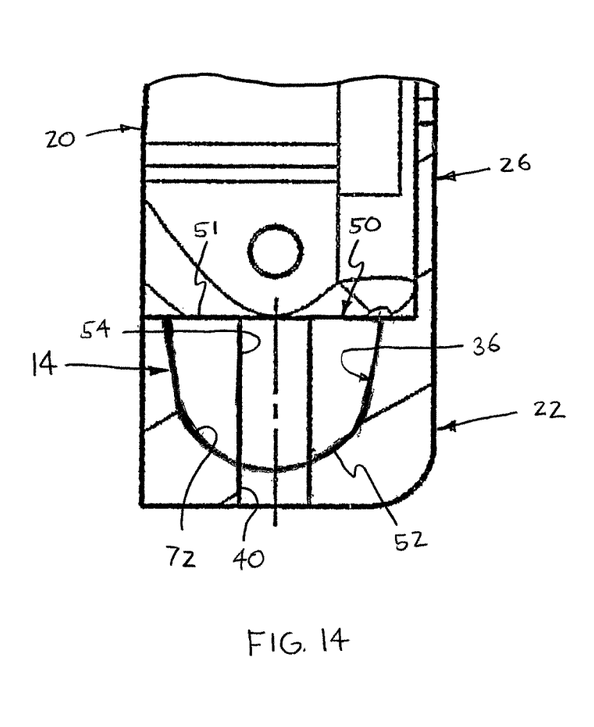
FIG. 14 is a broken-away, enlarged view of a lower portion of FIG. 13.

The fitting 12 is preferably formed of a composite material, including generally long strand fibers and resin, and includes at least first and second mounting portions 20, 22, respectively, integrally connected by a joint portion 24. In some constructions, the fitting 12 is generally L-shaped and has a single first mounting portion 20 and a single second mounting portion 22, as shown in FIGS. 5-11. In other constructions, the fitting 12 is generally T-shaped and preferably includes a single, central first mounting portion 20 and the second mounting portion 20 includes two second mounting portion halves 23A, 23B, as shown in FIGS. 1-4. The two second mounting portion halves 23A, 23B extend in opposing directions from the central first mounting portion 20 and are each integrally connected with the first mounting portion by a separate joint portion 25A, 25B, respectively. Further, in yet other constructions, the fitting 12 may include a third mounting portion 26 connected with the first portion 18 or the second portion 20 by another joint portion, preferably connected to each by two other joint portions 27A, 27B so as to form a "corner-like fitting, as depicted in FIGS. 12-14. The third mounting portion 26 may be connected with a third member (not shown) or with one of the first and second members 1, 2. Furthermore, the fitting 12 may even have fourth, fifth, etc. mounting portions (no other alternatives shown).

In all of the various fitting constructions, each first mounting portion 20 is connectable with the first member 1, for example a strut 3, and has opposing, first and second generally planar, generally vertical surfaces 30, 32, inner and outer ends 20a, 20b, and opposing sides 20c, 20d extending between the ends 20a, 20b. The first mounting portion 20 includes at least one preferably a plurality of mounting holes 34 each having a central axis 35. The mounting hole(s) 34 each extend between the first and second surfaces 30, 32 and are provided for connecting the first mounting portion 20 with the first member 1, for example by one or more pins 19 (or fasteners 15) each extending through a separate one of the holes 34 and into the first member 1.

Further, each fitting second mounting portion 22 extends generally angled with respect to the first mounting portion 20, the particular extent of such angular relationship, i.e., generally right angled, acute angled or obtuse angled, depending on the relative positioning and orientation of the first and second members 1, 2. The second mounting portion 22 is connectable with the second member 2, e.g. a portion of an airframe 4, and has a first, upper generally horizontal surface 36 and an opposing second, lower generally horizontal surface 38, inner and outer ends 22a, 22b, and opposing sides 22c, 22d. Further, the second mounting portion 22 has at least one and preferably a plurality of mounting holes 40 each having a central axis 41. Each second mounting portion hole 40 extends between the upper and lower surfaces 36, 38 and is provided for connecting the second mounting portion 22 with the second member 2, preferably by means of a fastener 15 extending through each hole 40 and into the second member 2.

Furthermore, each fitting joint portion 24 is generally curved and integrally connects the inner end 20a of the first mounting portion 20 with the inner end 22a of the second mounting portion 22, and is formed so as to position the two mounting portions 20, 22 at a desired angle or relative orientation. In certain constructions, the fitting joint portion 24 has at least one load section 25 defined between a concave surface section 31 and a convex surface section 33. Specifically, the concave surface section 31 extends between the first surfaces 30, 36 of the first and second mounting portions 20, 22, respectively, and has a radius of curvature (not indicated). Further, the convex surface section 33 extends between the second surfaces 32, 38 of the first and second mounting portions 20, 22, respectively.

Referring to FIGS. 1-5 and 7-10, due to the nature of fabricating an angled fitting 12 from a long strand fiber composite material, which tends to cause curvature in the second portion 22 angled or bended from the generally straight first portion 20, the fitting 12 preferably further includes a sole 42 to provide the fitting 12 with a substantially flat base surface 44 for interfacing with the second member 2. The sole 42 is preferably formed of a composite material of generally short strand fibers and resin, as such material is more readily capable of forming complex shapes or curves. Further, the sole 42 has an upper surface 46 disposed against the second, lower surface 38 of the second mounting portion 22 and the opposing lower surface 44 is at least generally flat. The upper surface 46 is shaped or formed to be juxtaposed with the mounting portion lower surface 38, and thus is typically curved in at least one and possibly multiple planes. Furthermore, the sole 42 is joined to the fitting second mounting portion 22 to form an integral assembly, i.e., with the fitting 12, the washer(s) 14, and possibly the insert(s) 16. Preferably, the sole 42 is preformed of the short form fiber composite material, positioned against the lower surface 38 of the fitting second mounting portion 22, and then heat is applied to cure the fitting 12, the washer(s) 14 and the sole 42 to integrally join all parts of the assembly 10, as described in further detail below.

Referring now to FIGS. 1-6, 8, 9 and 11-14, each washer 14 has opposing upper and lower surfaces 50, 52, respectively, and at least one hole 54 extending between the upper and lower surfaces 50, 52. Each washer hole 54 is configured to receive a fastener 15 for attaching the second mounting portion 22 to the second member 2. The washer upper surface 50 has a load surface section 51 extending circumferentially about each mounting hole 54 for a fastener head 17 (FIG. 1) to apply compressive force, which may be a portion of the upper surface or the entire upper surface. Further, the washer lower surface 52 is disposed on the second mounting portion upper surface 36 such that the washer hole 54 is generally centered about the central axis 41 of one mounting hole 40. Furthermore, the washer 14 is joined to the second mounting portion 22 to form an integral assembly, preferably in one of the following manners.

In certain connector assemblies 10, the washer 14 is formed of a composite material including short strand fibers and resin. With such washer material, the washer 14 is preferably joined to the fitting 12 by curing of the fitting material, and thus also the washer material, such that there is molecular chain bonding between the material of the washer 14 and the fitting 12. More specifically, the fitting 12 and washer are each separately pre-formed of the long strand fibers and short strand fibers, respectively. Then, the one or more washers 14 are each positioned on the fitting 12, as described above and in further detail below, and then heat is applied to the assembly to cure the fitting and washer materials, thereby permanently joining the washer(s) 14 to the fitting 12.

In other constructions, the washer 14 is formed of either a metallic material, such as for example, steel, aluminum, etc., a ceramic material, a rigid polymeric material or any other appropriate material. Each washer 14 formed of such materials is also preferably joined to the fitting 12 by curing the fitting material. As with the composite material washer, the fitting 12 is pre-formed of long strand fibers by an appropriate process and washer(s) 14 are each formed as appropriate for the type of washer material. Then, the one or more washers 14 are positioned on the fitting 12 and heat is applied to cure the fitting material, which also fuses adjacent portions of the fitting composite material to each washer 14 to thereby permanently join the washer 14 to the fitting 12. Alternatively, the washer(s) 14 may be joined to the fitting 12 by an adhesive, a bonding agent or any other appropriate means to integrally join the washer(s) 14 to the fitting 12.

Still referring to FIGS. 1-6, 8, 9 and 11-14, each washer 14 may be formed in any of a variety of shapes. For example, each washer 14 may be formed as a conventional washer including a generally circular plate (not shown), as a generally rectangular or polygonal disk-like body 62 (FIGS. 1-4), as an elongated, half-cylindrical body 64 (FIGS. 5-8), as a complex-shaped body 66 (FIGS. 9 and 11), as an at least partially spherical body 68 (FIGS. 12-14) or in any other appropriate shape for a particular application. In certain fitting constructions, the fitting second mounting portion 22 has at least two mounting holes 40 extending between the first, upper surface 36 and the second, lower surface 38. The connector assembly 10 may either include at least two washers 14 of a conventional shape or formed to fit the mounting portion surface profile, as depicted in FIGS. 1-4 and discussed further below, or may include a single washer 14 having an elongated body 68 with two or more holes 54, as shown in FIGS. 5-9 and 11 and described in detail below.

More specifically, with two separate washers 14, each washer lower surface 52 is disposed on the second mounting portion upper surface 36 such that the hole 54 of each washer 14 is generally centered about the axis 41 of a separate second mounting portion hole 40. Further, with a single elongated washer body 64, the body 64 has at least two holes 54 extending between the upper and lower surfaces 50, 52 and spaced apart such that each washer hole 54 is generally centered about a separate one of the hole axes 41 of the second mounting portion 22 when the elongated body 64 is positioned on the second mounting portion upper surface 36.

Figure 3:
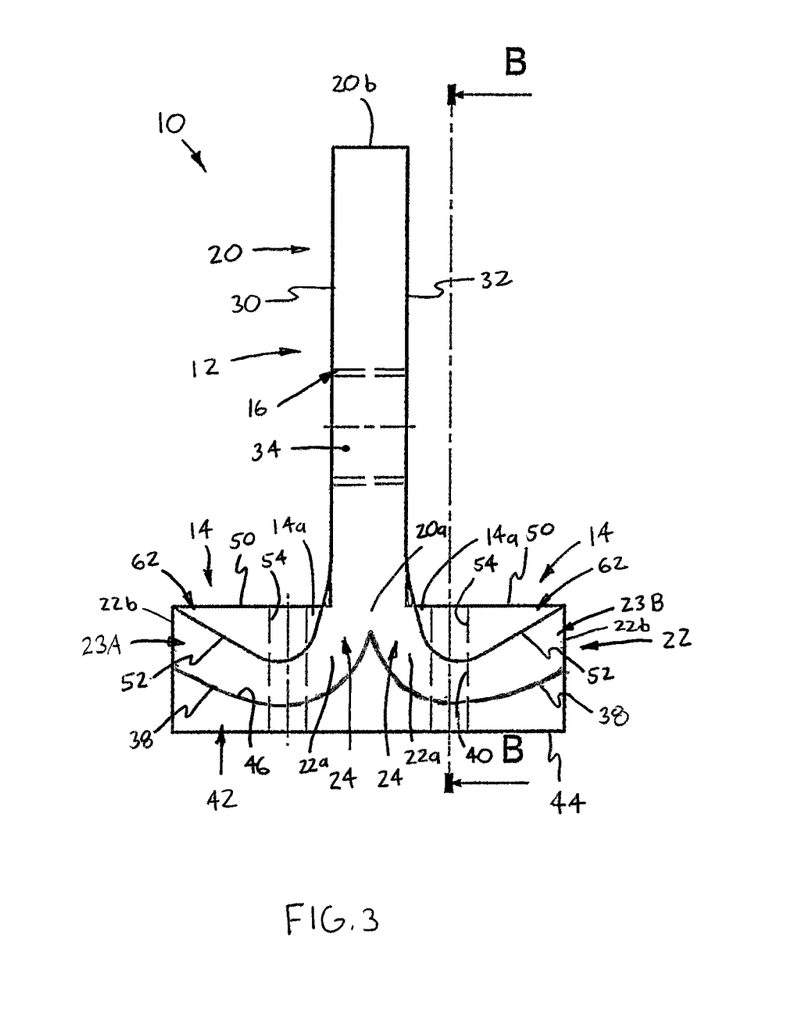
FIG. 3 is a side plan view of the connector assembly of FIG. 1.
Figure 4:
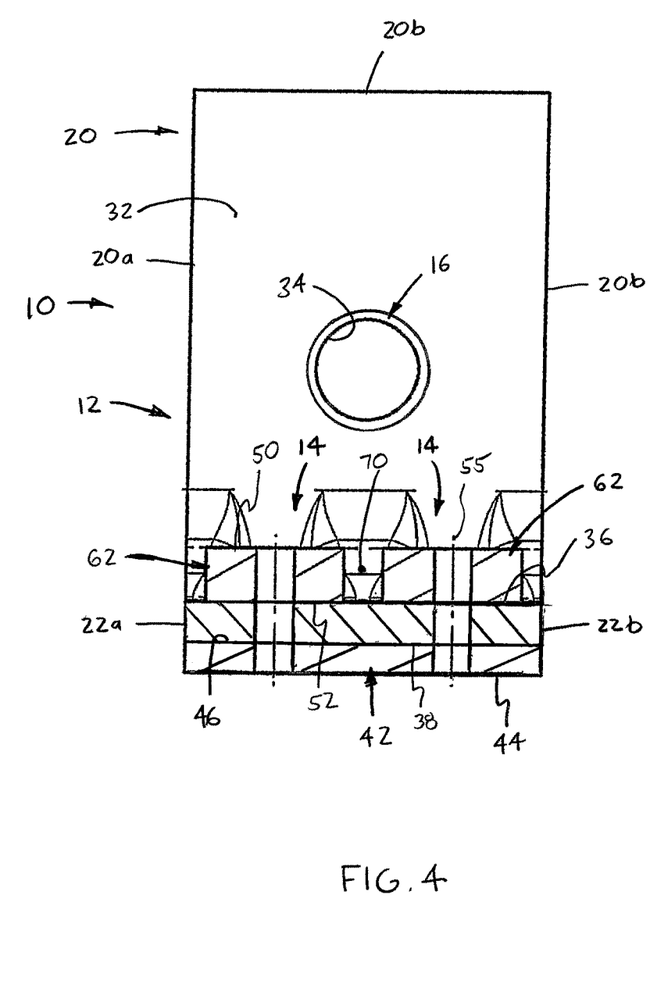
FIG. 4 is a view through line 4-4 of FIG. 3.
Figure 8:
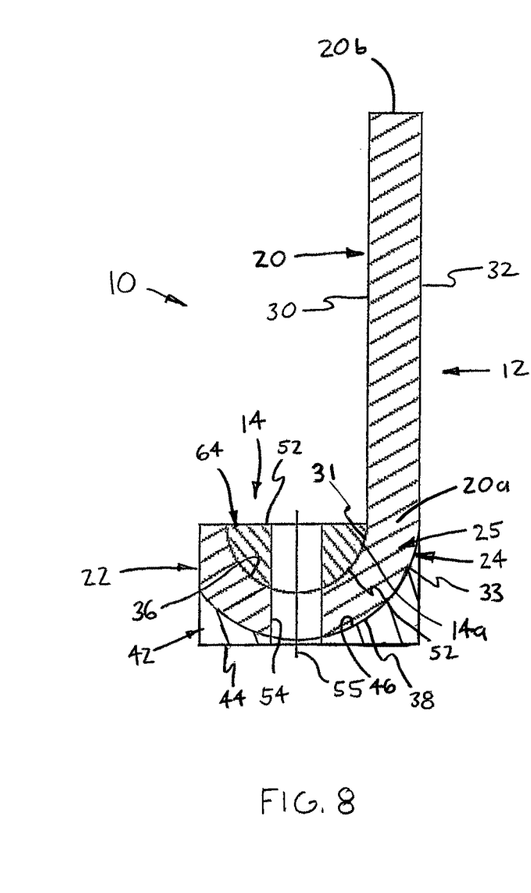
FIG. 8 is a cross-sectional view of the connector assembly of FIG. 5.
Figure 9:
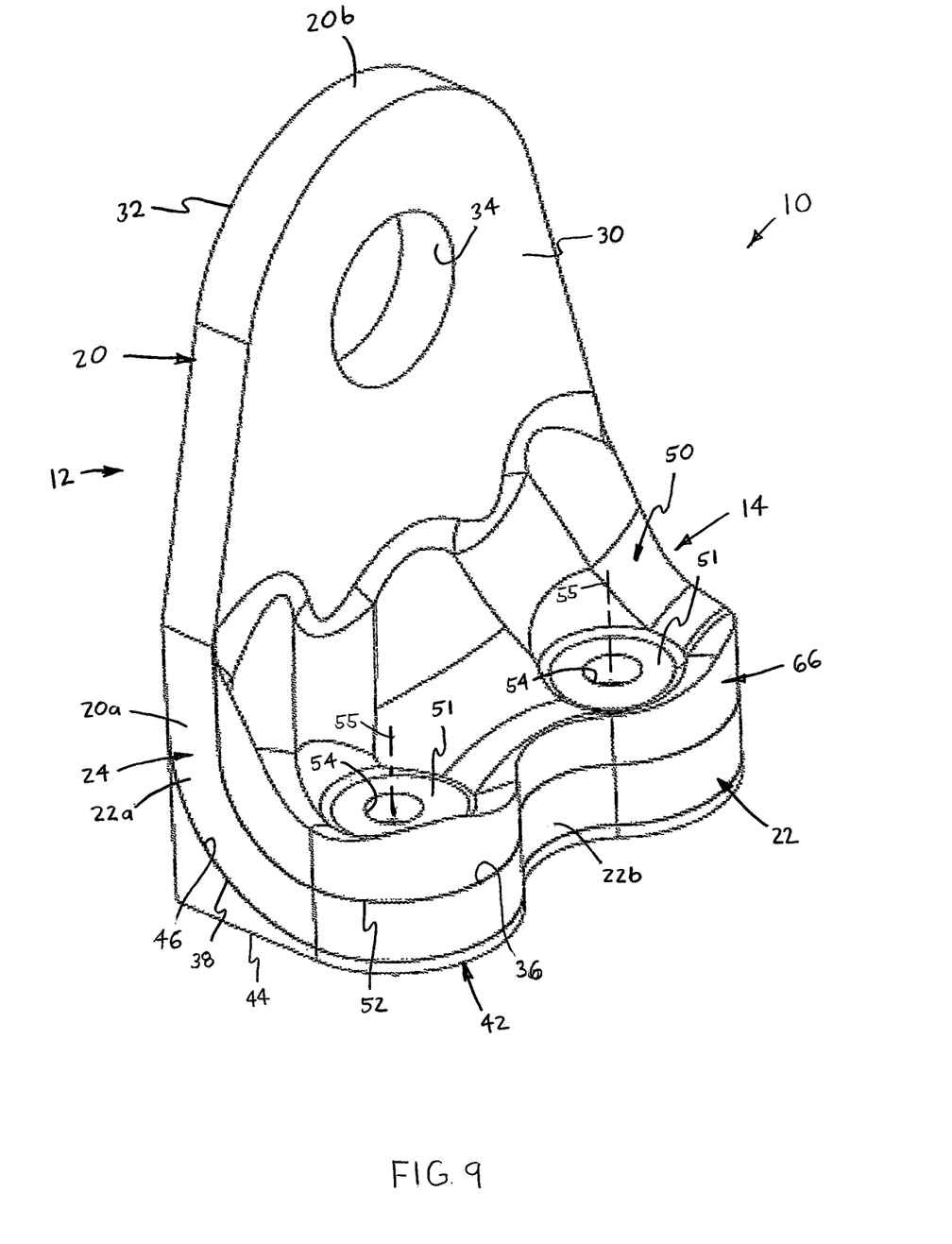
FIG. 9 is a perspective view of a third construction of the connector assembly, having a complex-shaped washer.

Referring particularly to FIGS. 3 and 8, in certain connector assemblies 10, the one or more washers 14 are sized and formed such that a portion 14a of each washer 14 is disposed generally against the joint load section concave surface 33. Preferably, the washer load portion 14a has a radius of curvature about equal to the fitting joint portion radius of curvature. As such, when a fastener 15 exerts compressive force on the washer load surface section 51, the washer portion 14a exerts force generally against the joint portion load section 25. Thus, the washer 14 compresses resin in the fitting load section 25 when tensile force and/or torque is applied to the fitting first mounting portion 20.

Figure 10:
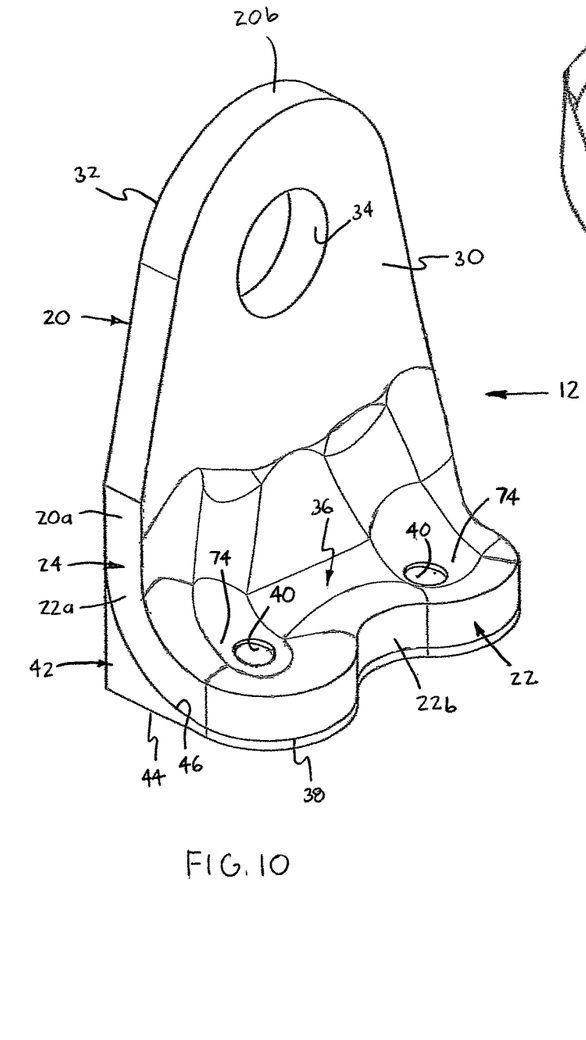
FIG. 10 is a perspective view of the fitting of FIG. 9.
Figure 11:
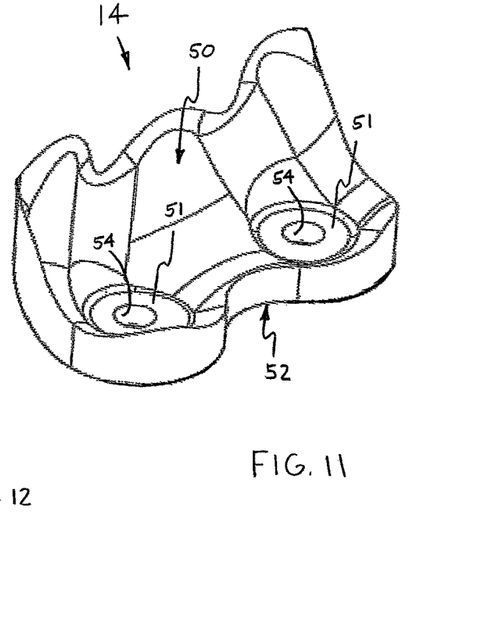
FIG. 11 is a perspective view of the washer of FIG. 9.

Referring to FIGS. 1-5, 7-10 and 12-14, in most fitting constructions, the second mounting portion 22 is formed such that the first, upper surface 36 has a bended or curved profile extending at least partially axially with respect to the axis 41 of each mounting hole 40. The upper surface 36 may have a "trough-like" groove 70 extending laterally between the second mounting portion sides 22c, 22d, may have a single concave, partially spherical depression 72 as shown in FIGS. 13 and 14, may have two concave, partially spherical depressions 74, as depicted in FIG. 10, or may have any other appropriate shape for a particular application. With such fitting structures, the washer 14 is formed with a lower surface 52 having a bended or curved profile configured to be juxtaposed against, i.e., closely fitted against, at least a section of the second mounting portion upper surface 36. Further, the washer upper surface 50 has a substantially flat load surface section 51 extending circumferentially about each washer hole 54 and substantially radially with respect to the mounting hole axis 55, which is engageable by a fastener head 17 as discussed above.

Figure 5:
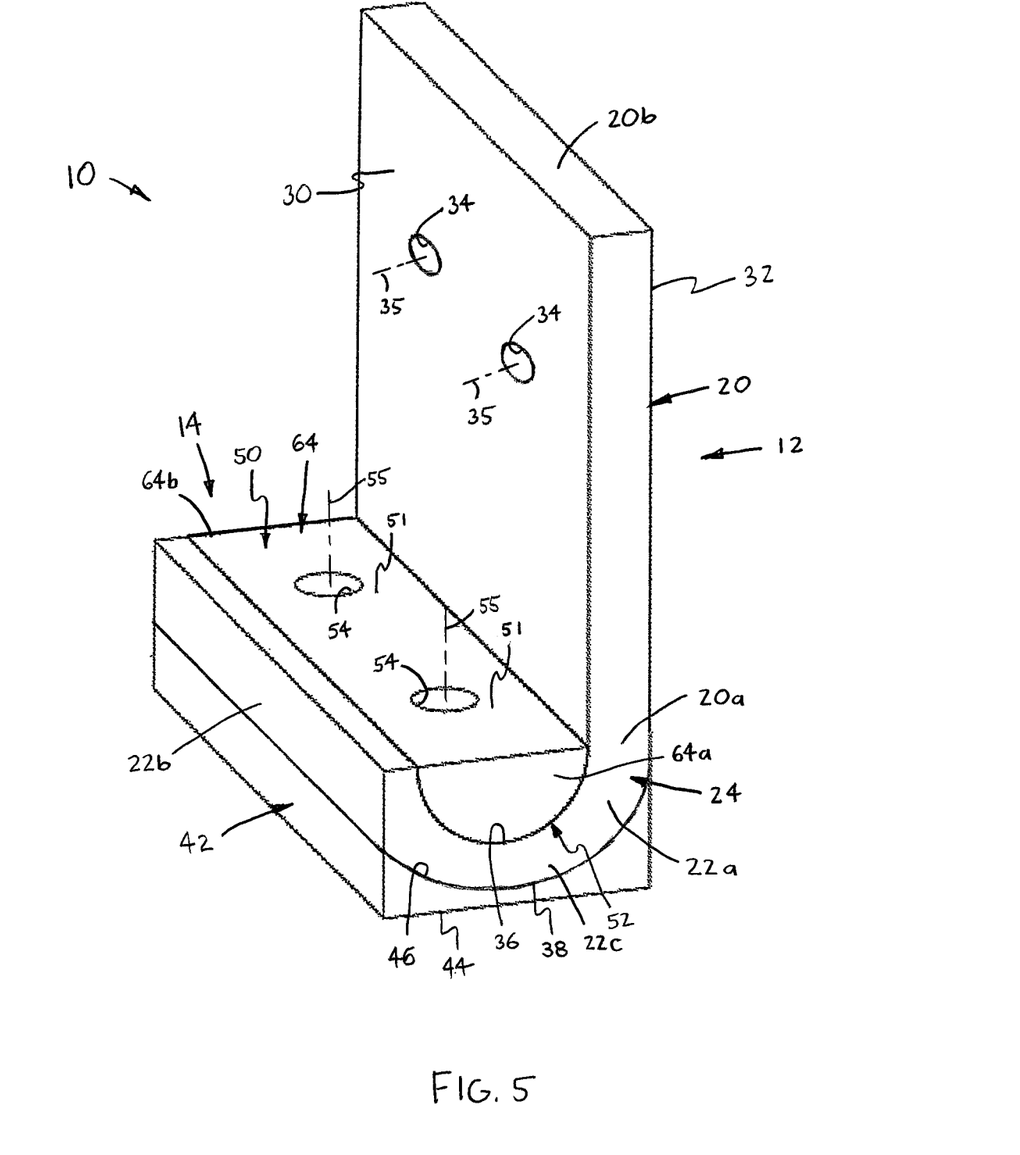
FIG. 5 is a perspective view of a second construction of the connector assembly, having an L-shaped fitting and a single elongated washer.
Figures 6, 7:
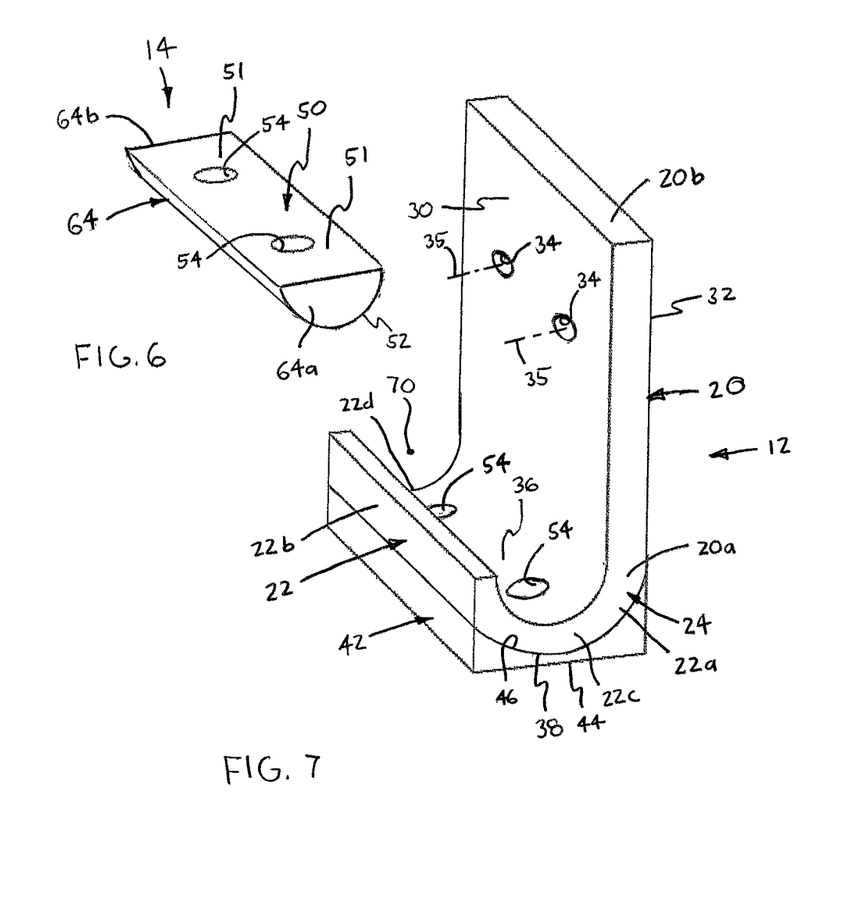
FIG. 6 is a perspective view of the washer of FIG. 5.
FIG. 7 is a perspective view of the fitting of FIG. 5.

More specifically, with a second mounting portion upper surface 36 that is generally concave, the washer lower surface 52 is generally convex and shaped to match the mounting portion upper surface 36. For example, with a mounting portion upper surface having a generally cylindrical "trough" groove 70, the connector assembly 10 may include two washers 14, each having a generally rectangular body 64 with opposing side ends 64a, 64b and a partially cylindrical lower surface 52 extending between the ends 64a, 64b, as shown in FIGS. 1-4. Alternatively, the washer 14 may include a single elongated body 64 having opposing side ends 64a, 64a and a partially cylindrical lower surface 52 extending between the ends 64a, 64b, as depicted in FIGS. 5, 6 and 8. Further, with a second mounting portion 22 having two circular or partially-spherical depressions 74, as shown in FIG. 10, the washer 14 may have a complex-shaped body 66 formed to fit against multi-curved second mounting portion upper surface 36, and thus having two convex, partially spherical portions (not shown) on the lower surface 52 each disposable within one of the depressions 74, as well as other curved sections of the joint portion 24 and first mounting portion 20.

Referring now to FIGS. 1-4, the connector assembly 10 may have one or more of the generally tubular inserts or bushings 16 each disposed within one of the mounting holes 34, 40 of either the first or second mounting portion 20, 22, respectively. The inserts/bushings 16 function to generally reinforce the section of the mounting portion 20, 22 about the mounting hole 34 or 40 when loading is applied at the mounting hole 34, 40, such as through a pin 19. As with the washer (14), each insert 16 is joined with the particular one of the mounting portions 20 or 22 to form an integral connector assembly 10. The insert(s) 16 may be formed of a composite material that includes generally short strand fibers and resin, such that there is molecular chain bonding between the material of the insert 16 and the material of the fitting 12 during curing of the fitting 12. However, the insert 16 may alternatively be formed of a metallic material, a rigid polymeric material or any other appropriate material. Further, each insert 16 may be formed with any appropriate shape, such as for example, having a generally circular cylindrical tubular body (as shown), a generally conical tubular body, a stepped tubular body and generally hourglass-shaped tubular body (no other alternatives shown).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A connector assembly for connecting at least first and second members, the connector assembly comprising:
    a fitting formed of a composite material including long strand fibers and resin, the fitting including a first mounting portion having opposing first and second surfaces and at least one mounting hole extending between the first and second surfaces for connecting with the first member, a second mounting portion extending generally angled with respect to the first mounting portion and having opposing first and second surfaces and at least one mounting hole extending between the inner and outer surfaces for connecting with the second member, the at least one second portion mounting bole having a central axis, and a joint portion integrally connecting the first and second mounting portions; and
    at least one washer having opposing upper and lower surfaces and at least one hole extending between the upper and lower surfaces, the washer hole being configured to receive a fastener for attaching the second mounting portion to the second member, the washer lower surface being disposed on the second mounting portion inner surface such that the washer opening is generally centered about the at least one mounting hole axis, the washer being joined directly to the composite material of the second mounting portion by curing of the composite material to form an integral assembly.

2. The connector assembly as recited in claim 1 wherein the at least one washer is formed of at least one of a metallic material, a ceramic material, a rigid polymeric material and a composite material including short strand fibers and resin.

3. The connector assembly us recited in claim 1 wherein the at least one washer is joined to the fitting by molecular chain bending.

4. The connector assembly as recited in claim 1 wherein the fitting is one of generally L-shaped and generally T-shaped.

5. The connector assembly as recited in claim 1 wherein the fitting further includes a third mounting portion extending generally angled with respect to each of the first and second mounting portions, the third mounting portion having, at least one mounting hole for connecting with a third member, and at least one other joint portion integrally connecting the third Mounting portion with one of the first and second mounting portions.

6. The connector assembly as, recited in claim 1 wherein the at least one washer includes one of a generally circular plate, and at least partially spherical disk-like body, a polygonal disk-like body and a complex-shaped body.

7. The connector assembly as recited in claim 1 wherein:
    the fitting joint portion has at least one load section defined between a concave surface section extending between the inner surfaces of the first and second mounting portions and a convex surface section extending between the outer surfaces of the first and second mounting portions; and
    the at least one her has a portion disposed generally against the joint load section concave surface so that the washer exerts force generally against the joint portion load section when at least one fastener clamps the washer to the second mounting portion to attach the second mounting portion to the second member.

8. The connector assembly as recited in claim 7 wherein washer portion exerts force against the joint portion load section to compress resin in the fitting load section when at least one of tensile force and torque is applied to the fitting first mounting portion.

9. The connector assembly as recited in claim 1 wherein:
    the second mounting portion inner surface has a curved profile extending at least partially axially with respect to the mounting hole axis; and
    the at least one washer has a lower surface with a curved profile configured to be juxtaposed against at least section of the second mounting portion curved upper surface and the washer upper surface has at least one substantially flat load surface section extending circumferentially about the washer hole and substantially radially with respect to the mounting hole axis, the load surface section being engageable by a fastener head.

10. The connector assembly as recited in claim 1 wherein:
    the fitting second mounting portion has at least two mounting holes each extending between the mounting portion inner and outer surfaces; and
    the at least one of washer includes two washers each having opposing upper and lower surfaces and a hole extending between the upper and lower surfaces, each one of the two washer lower surfaces being disposed on the second mounting portion inner surface such that the hole of each washer is generally centered about the mounting hole axis of a separate one of two mounting hole axes, each one of the washers being bonded to the second mounting portion to form an integral assembly.

11. The connector assembly as recited in claim 1 wherein:
    the fitting second mounting portion has at least two mounting holes each extending between the mounting portion inner and outer surfaces; and
    the at least one of washer includes an elongated body having upper and lower surfaces and two holes extending between the upper and lower surfaces, the two holes being spaced apart such that each washer hole is generally centered about the mounting hole axis of a separate one of two mounting hole axes, the washer elongated body being joined to the second mounting portion.

12. The connector assembly as recited in claim 1 further comprising a sole formed of short strand fibers and having an upper surface disposed against the outer surface of the second mounting portion and an opposing, flat lower surface, the sole being joined to the fitting second mounting portion to form an integral assembly.

13. The connector assembly as recited in claim 1 further comprising at least one generally tubular insert disposed within one of the mounting holes of one of the first and second mounting portions, the insert being joined with theme mounting portion to form an integral assembly.

14. The connector assembly as recited in claim 13 wherein the insert has one of a generally circular cylindrical tubular body, a generally conical tubular body, a stepped tubular body and generally hourglass-shaped tubular body.

15. A connector assembly for connecting at least first and second members, the connector assembly comprising:
a fitting formed of a composite material including long strand fibers and resin, the fitting including a first mounting portion connectable with the first member and having opposing first and second surfaces and at least one mounting hole extending between the inner and outer surfaces for connecting with the first member, a second mounting portion extending generally angled with respect to the first mounting portion, connectable with the second member and having opposing first and second surfaces and at least one mounting hole extending between the first and second surfaces for connecting with the second member, the second portion mounting hole having a central axis, and a joint portion integrally connecting the first and second mounting portions;

at least one of:
at least one washer having opposing upper and lower surfaces and at least one hole extending between the upper and lower surfaces, the washer hole being configured to receive a fastener for attaching the second mounting portion to the second member, the washer lower surface being disposed on the second mounting portion inner surface such that the washer opening is generally centered about the at least one mounting hole axis, the washer being joined directly to the composite material of the second mounting portion by caring of the composite material to form an integral assembly; and at least one generally tubular insert disposed within one of the mounting holes of one of the first and second mounting portions, the insert being joined with the one mounting portion to form an integral assembly; and a sole formed of short strand fibers and having an upper surface disposed against the second surface of the second mounting portion and an opposing, flat lower surface, the sole being joined to the fitting second mounting portion to form an integral assembly.

* * * * *